United States Patent
Dunsdon (10) Patent No.: US 9,321,542 B2
(45) Date of Patent: Apr. 26, 2016

(54) DIAGNOSTICS FOR AIRCRAFT

(75) Inventor: Jonathan Mark Dunsdon, Glenville, NY (US)

(73) Assignee: GE AVIATION SYSTEMS LIMITED, Gloucestershire (GB)

(*) Notice: Subject to any disclaimer, the term of this patent is extended or adjusted under 35 U.S.C. 154(b) by 0 days.

(21) Appl. No.: 13/530,933

(22) Filed: Jun. 22, 2012

(65) Prior Publication Data

US 2013/0166135 A1 Jun. 27, 2013

(30) Foreign Application Priority Data

Jun. 24, 2011 (GB) ................................ 1110703.4

(51) Int. Cl.
- *B64F 5/00* (2006.01)
- *G07C 5/08* (2006.01)
- *G07C 5/00* (2006.01)

(52) U.S. Cl.
CPC ............. *B64F 5/0045* (2013.01); *B64F 5/0081* (2013.01); *G07C 5/0808* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 5,561,760 A * | 10/1996 | Ferris et al. | ..... | 714/25 |
| 5,860,810 A * | 1/1999 | Faul | ..... | 434/219 |
| 5,931,877 A | 8/1999 | Smith et al. | | |
| 6,621,412 B1 * | 9/2003 | Markle et al. | ..... | 340/517 |
| 6,789,007 B2 | 9/2004 | Ellis et al. | | |
| 6,829,527 B2 * | 12/2004 | Felke et al. | ..... | 701/29.3 |
| 7,702,435 B2 * | 4/2010 | Pereira et al. | ..... | 701/30.8 |
| 7,706,936 B2 * | 4/2010 | Krzystofczyk et al. | ..... | 701/31.8 |
| 7,761,201 B2 * | 7/2010 | Avery et al. | ..... | 701/29.3 |
| 7,823,062 B2 * | 10/2010 | Liberty et al. | ..... | 715/234 |
| 7,949,444 B2 * | 5/2011 | Mukherjee | ..... | 701/31.4 |
| 8,659,447 B2 | 2/2014 | Francois et al. | | |
| 2002/0198639 A1 | 12/2002 | Ellis et al. | | |
| 2006/0074597 A1 * | 4/2006 | Raphael et al. | ..... | 702/183 |
| 2007/0255444 A1 * | 11/2007 | Kauffman et al. | ..... | 700/117 |
| 2009/0094076 A1 | 4/2009 | Reddy | | |
| 2010/0042283 A1 | 2/2010 | Kell et al. | | |
| 2010/0083056 A1 | 4/2010 | Spier et al. | | |
| 2010/0152962 A1 | 6/2010 | Bennett et al. | | |
| 2010/0217638 A1 * | 8/2010 | Dickson et al. | ..... | 705/7 |
| 2010/0318396 A1 | 12/2010 | Geddam et al. | | |

FOREIGN PATENT DOCUMENTS

| | | |
|---|---|---|
| FR | 2935818 A1 | 3/2010 |
| WO | 20070224273 A1 | 3/2007 |

OTHER PUBLICATIONS

Great Britain Search Report dated Oct. 17, 2011 which was issued in connection with the GB Patent Application No. 1110703.4 which was filed on Jun. 24, 2011.
Mathur: "An integrated support system for rotorcraft health management and maintenance", Aerospace Conference Proceedings, 2000, vol. 6 pp. 1-8 Location: Big Sky, MT.
Westervelt: "Transforming a maintenance ground station", Aerospace Conference, Mar. 5-12, 2005. pp. 3723-3731Location: Big Sky, MT.
Unofficial translation of FR Preliminary Search Report issued in correlation to corresponding FR Application 1255926. Official Action was issued on Jan. 7, 2016.

* cited by examiner

*Primary Examiner* — Helal A Algahaim
*Assistant Examiner* — Donald J Wallace
(74) *Attorney, Agent, or Firm* — GE Global Patent Operation; William S. Munnerlyn (57) ABSTRACT

A system for automatically analysing aircraft systems data is described. The system comprises a data acquisition module operable to acquire aircraft systems data, a data archiving module operable to store aircraft systems data and a data analysis module operable to analyse the aircraft systems data to identify non-predetermined troubleshooting procedures for fault rectification. Automated identification of improved maintenance techniques can thus be provided, with the added benefit that maintenance manuals and procedures may thereby be automatically adapted over time. A related method is also described.

15 Claims, 4 Drawing Sheets

DIAGNOSTICS FOR AIRCRAFT

CROSS-REFERENCE TO RELATED APPLICATIONS

This application claims foreign priority under 35 U.S.C. §119 to application No. GB1110703.4, filed Jun. 24, 2011, which is hereby incorporated by reference in its entirety as part of the present disclosure.

BACKGROUND OF THE INVENTION

1. Field of the Invention

The present invention relates generally to improved diagnostics for aircraft. More particularly, the present invention relates to a system and method for collating and analysing aircraft specific data so as to improve fault troubleshooting and maintenance diagnostics in aircraft.

2. Description of the Related Art

Developments in aviation have lead to increasingly complex systems being installed in aircraft for the diagnosis, monitoring and management of various on-board systems. In order to help manage this increased complexity, various aircraft systems now incorporate or are able to provide electronically stored copies of various maintenance manuals and procedures for the specific aircraft or aircraft type [1-7]. Such manuals may be stored in an on-board maintenance system, for example. Often these are equivalent to paper manuals created before the aircraft first flies, or shortly after an initial test-flight, and subsequently approved by a state-run certifying authority (such as, for example, the Federal Aviation Authority (FAA) in the US or Civil Aviation Authority (CAA) in the UK).

Various predetermined troubleshooting procedures and repair techniques based upon an analysis of expected faults and their propagation may also be included in such maintenance manuals. These may be provided by design engineers based upon their previous experience or using simulated data. However, such "hard-coded" predetermined procedures are often sub-optimal and can thus lead to maintenance personnel inefficiently troubleshooting, for example, by removing and replacing incorrect components or line replaceable units (LRU's) such that one or more "No Fault Found" (NFF) conditions are obtained before the problem is eventually rectified. Other potential consequences include an increased out of service time, delays, possible flight cancellations, etc.

Additionally, engineers may only have an incomplete knowledge of various maintenance issues, especially regarding the emergent properties of a system, such as failure cases for example, which may be so complex that their properties cannot be accurately modelled or predicted in the development phase.

In light of this it is known that various maintenance engineers keep unofficial records of troubleshooting procedures that, in their experience, are believed to work better or more quickly than the recommended official versions. Given the unofficial nature of such procedures, however, such hands-on experience is generally neither peer reviewed or widely disseminated, to the overall detriment of the aviation community at large.

Accordingly, it would be highly desirable to provide faster and more accurate maintenance techniques for aircraft thereby reducing both the direct costs associated with troubleshooting faults and secondary costs caused by time delays due to missed flights, delayed flights, NFFs, etc. This would also provide the benefit that fewer modifications would need to be made to an aircraft undergoing maintenance thereby reducing the chance that an otherwise reliable component is made unreliable by being removed and handled.

BRIEF DESCRIPTION OF THE INVENTION

The present invention has therefore been devised whilst bearing the above-mentioned drawbacks associated with known maintenance techniques in mind.

According to one aspect of the present invention, there is provided a system for automatically analysing aircraft systems data. The system comprises a data acquisition module operable to acquire aircraft systems data, a data archiving module operable to store aircraft systems data and a data analysis module operable to analyse the aircraft systems data to identify non-predetermined troubleshooting procedures for fault rectification.

According to a further aspect of the present invention, there is provided a method for automatically analysing aircraft systems data. The method comprises the steps of acquiring aircraft systems data, storing the aircraft systems data, and analysing the aircraft systems data to identify non-predetermined troubleshooting procedures for fault rectification.

By providing automated analysis of aircraft systems data to identify non-predetermined troubleshooting procedures for fault rectification, an adaptive system and method may be provided. Such techniques can also provide solutions to fix rare faults that most engineers would not experience during their careers, and further permit the identification of possible inherent design faults in specific aircraft types based on globalised data analysis, for example, at the fleet level.

BRIEF DESCRIPTION OF THE DRAWINGS

Various aspects and embodiments of the present invention will now be described in connection with the accompanying drawings, in which.

DETAILED DESCRIPTION OF THE INVENTION

Figure 1:
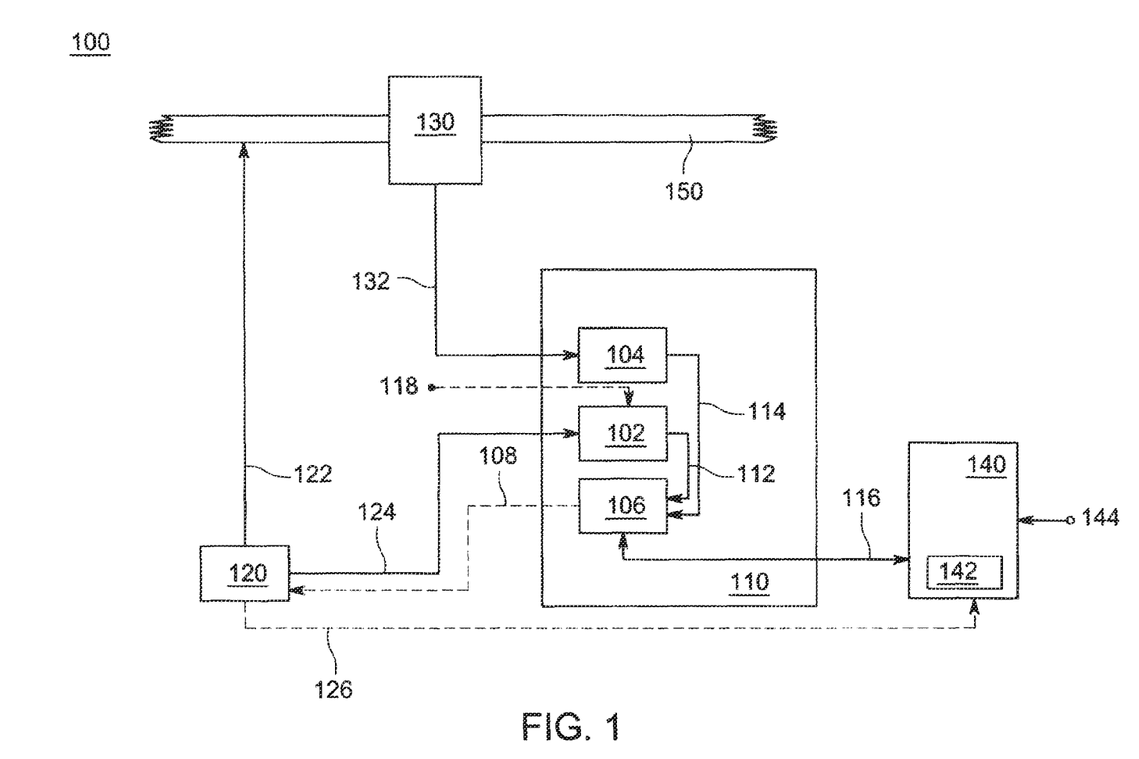
FIG. 1 shows a system for automatically analysing aircraft systems data in accordance with an embodiment of the present invention.

FIG. 1 shows a system 100 for automatically analysing aircraft systems data in accordance with an embodiment of the present invention. The system 100 includes a data monitor 130 for monitoring aircraft systems data transmitted over an aircraft system data bus 150. The data monitor 130 may be an addressable device interfaced to the bus, or could be provided by a data sniffer that monitors data packets transmitted over the aircraft system data bus 150 such that unobtrusive monitoring can be provided without the need for separate addressing of the data monitor 130 to be provided. Use of a data sniffer may thus be preferred in various embodiments so that addressing errors in the aircraft system data bus 150 do not prevent continuous operation of the monitoring function. Further by using a data sniffer, the data monitor 130 need not be hard-coded or hardwired into the aircraft system data bus 150 such that integration with, and retro-fitting to, existing aircraft systems may be facilitated.

A processing module 110 is included in the system 100. The processing module 110 includes: a data archiving module 104 coupled to the data monitor 130 via data link 132; a data analysis module 106 coupled to the data archiving module 104 via data link 114; and a data acquisition module 102 coupled to the data analysis module 106 via data link 112. Various modules may be provided using one or more of firmware, hardware and software components.

An optional external data link 118 is provided to connect the data acquisition module 102 to, for example, a central database (not shown) that resides off-aircraft. In operation, the data acquisition module 102 acquires aircraft systems data relating to currently-known predetermined maintenance procedures for fixing specific problems. In this embodiment such procedures can be obtained from a source external to the aircraft via the data link 118 and/or from an internal maintenance manual storage module 120 coupled to the data acquisition module 102 via data link 124. The data acquisition module 102 may thus be further operable to acquire the aircraft systems data from a plurality of aircraft. In this manner a plurality of systems 100 could be connected together (e.g. using remote networking) to analyse data from aircraft of similar or different types (e.g. Airbus® A340, A380's that use common or similar data systems). For example, various systems may send data to a central location where it is analysed. Updates may then be pushed out back to the respective aircraft from the central location.

The data archiving module 104 operates in conjunction with the data monitor 130 to identify faults in the aircraft and record them for further actioning, e.g. for subsequent rectification by a maintenance engineer. For example, the data monitor 130 may detect various built-in test (BIT) signals asserted on the aircraft system data bus 150. Detection of such BIT signals may result in an error record being generated and stored by the data archiving module 104 along with further data relating to the state of the aircraft system data bus 150 at the time the BIT signal(s) were detected. The BIT signals can subsequently be used either individually or in various combinations to identify specific aircraft faults that need to be rectified or further investigated.

The data analysis module 106 is operable to analyse the aircraft systems data to identify non-predetermined troubleshooting procedures for fault rectification. In one algorithm a correlation measurement is used to identify a closest predetermined set of predetermined maintenance procedures for solving a particular maintenance problem. The specific problem, which may be labelled with a unique identifier (UID), is then defined as a starting point with statistical or pattern matching of predetermined actions to the actual steps taken being undertaken to find whether the actual actions taken are known or provide a potential, possibly more efficient, non-predetermined troubleshooting procedure for solving the same problem.

Data analysis module 106 is also operably connected to an input/output (I/O) interface module 140 through a bi-directional data link 116. The I/O interface module 140 may be operable to present a graphical user interface (GUI) (not shown) either on an integrated display (not shown) or by providing a graphics output for connection to a removable device having a display such as, for example, a laptop computer, personal digital assistant (PDA) or the like, when connected to the I/O interface module 140.

I/O interface module 140 additionally includes a maintenance task data capture module 142, and is connected to an external data link 144. In operation, a user (not shown) interacts with the system 100 by providing data input via the data link 144. Such input data may relate to specific tasks undertaken by the user, for example, when performing a maintenance task to repair a fault on an aircraft in which the system 100 is provided.

The OMS may also capture and store the full configuration data for the aircraft. This allows the system to determine what has been changed and when, which can be key to creating a closed-loop control system.

The maintenance task data capture module 142 can capture a list of such tasks detailing which tasks they were and the temporal order in which they were performed. Such a list may then, for example, be stored or recorded either locally or remotely in temporary and/or permanent storage such as in electronic memory, on a hard disk, etc. Analysis of such a list may subsequently be used to update maintenance procedures.

The maintenance manual storage module 120 is operably coupled to the aircraft system data bus 150 through data link 122 so as to provide maintenance information to an engineer when the aircraft is grounded and placed into maintenance mode. Optionally, such information may be provided to the engineer through the I/O interface module 140 via a data link 126 that connects the maintenance manual storage module 120 to the aircraft system data bus 150. As a further option, the predetermined troubleshooting procedures stored by the maintenance manual storage module 120 may be updated to include subsequently identified, or non-predetermined, troubleshooting procedures for fault rectification transmitted to the maintenance manual storage module 120 from the data analysis module 106 via optional data link 108. Such non-predetermined troubleshooting procedures for fault rectification may be stored for subsequent scrutiny by skilled personnel to verify their efficacy and safety and/or to help identify systemic deficiencies in the aircraft or aircraft type.

By way of non-limiting example, an arc fault detection module error may cause the data analysis module 106 to begin recording an actual maintenance procedure in response to the data archiving module 104 pushing a fault code (FAULT_CODE_ID) to the data analysis module 106. The fault code thus identifies the specific problem and may be labelled with a UID (e.g. FAULT_CODE_ID=AE7 may indicate a fault with a specific arc fault detection module located at a known location in the aircraft). The specific actual maintenance procedure actions taken to rectify the fault may then be recorded by prompting a maintenance engineer via the I/O interface module 140 to select various actions from a drop down list. Such actions may, for example, be recorded in tabular or list form.

With FAULT_CODE_ID=AE7 acting as a reference or pointer, the specific actual maintenance procedure actions taken may be as follows:

TABLE 1

| ACTION UID | Action | Fault Remedied after action completed? |
|---|---|---|
| 1E | Check power supply rails | N |
| 2A | Check inductor connections | N |
| 24 | Replace capacitor C1 | N |
| 9B | Replace capacitor C2 | Y |

A predetermined maintenance procedure for fault code AE7 may then be obtained by the data acquisition module 102 from the maintenance manual storage module 120. This predetermined maintenance procedure may also be in list, or alternatively tabular, form and is provided to the data analysis module 106 via data link 112. The predetermined maintenance procedure may, for example, be as follows:

TABLE 2

| ACTION UID | Action |
| --- | --- |
| 1E | Check power supply rails |
| 2A | Check inductor connections |
| 9B | Replace capacitor C2 |
| 41 | Replace inductor L2 |
| 24 | Replace capacitor C1 |

A correlation test may then be performed by the data analysis module 106 to identify non-predetermined troubleshooting procedures for fault rectification. For example, the data analysis module 106 may compare the table entries line by line to see if the same action codes appear at all or appear in the same order, either with or without intermediate steps. Alternative correlation techniques, including statistical matching for example, may also be used. Such an update may also be based upon what steps actually fix a specific problem. This can be determined from a combination of maintenance manual steps, with the configuration data showing what was changed when and fault/parametric data showing when the fault was truly resolved.

In this embodiment, a table comparison algorithm is used. This identifies that all of the actions actually taken (i.e. UIDs 1E, 2A, 24 and 9B) are present in the predetermined troubleshooting procedure as is stored in the maintenance manual storage module 120. However, the table comparison algorithm reveals that the predetermined troubleshooting procedure involves more steps than the actual troubleshooting procedure used, and that two of the steps (i.e. UIDs 24 and 9B) were used in a different sequence by the maintenance engineer. Both such indicators flag that a non-predetermined troubleshooting procedure has been found and the data table corresponding to the actual actions taken along with its fault code UID are then stored.

In this embodiment, the data analysis module 106 is further operable to automatically update the maintenance manual stored in the maintenance manual storage module 120. A data write operation is performed by the data analysis module 106 with a new data record having the format: FAULT_CODE_UID; ACTION_1_UID; ACTION_2_UID; . . . ACTION_lastnumber_UID; END_RECORD.

For example, a new data record "AE7; 1E, 2A, 24; 9B; END_RECORD" may be written by the data analysis module 106 to the maintenance manual storage module 120 through the data link 108 such that the maintenance manual storage module 120 is updated to include a new maintenance procedure corresponding to the identified non-predetermined troubleshooting procedure. Such a new maintenance procedure may then subsequently become a predetermined troubleshooting procedure for future analyses.

In various embodiments, data may be taken from numerous aircraft and events and a comparison of the approaches used and results achieved may be performed. Such a combination of multiple sources and events allows for statistical analysis. One further option is to review the history for a given aircraft to find which particular set of maintenance procedures resolved the problem, including the option of tracking the configuration/part numbers of the items replaced.

Various troubleshooting techniques may, for example, be done using either a simple logic tree/table approach where the structure of the tree/table is updated, or a probabilistic graphical modelling approach. For example, in various embodiments Bayesian reasoning is applied and the weightings of the probabilities updated.

Figure 2:
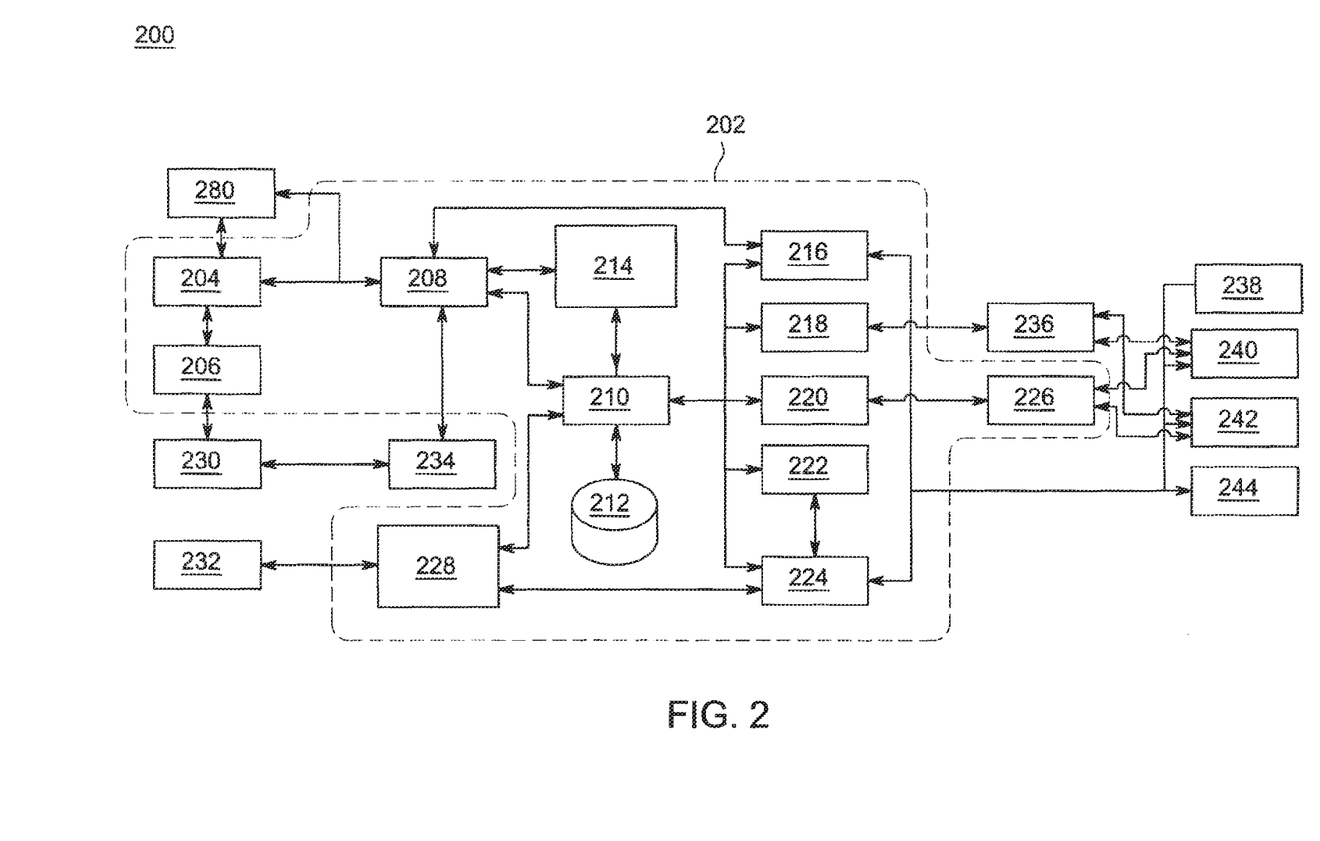
FIG. 2 shows a high-level functional architecture diagram of an on-board maintenance system in accordance with various embodiments of the present invention.

FIG. 2 shows a high-level functional architecture diagram 200 of an on-board maintenance system (OMS) in accordance with various embodiments of the present invention. OMS system boundary 202 is shown in dotted outline.

The OMS includes a Wi-Fi hub 204 provided as a line-replaceable unit (LRU) connected to a ground system network 206. The ground system network 206 is provided as a human machine interface (HMI). The Wi-Fi hub 204 is further connected to an external portable maintenance device 280 and to a maintenance communication manager 208. The external portable maintenance device 280 may also be provided as an HMI.

In various embodiments, maintenance communication manager 208 is provided by an aircraft health monitoring unit (AHMU) based software module. Maintenance communication manager 208 is also operably coupled to an externally provided communication management application 234. The communication management application 234 can be provided by an avionics electronic systems platform (ESP) software module. The communication management application 234 manages data transfer over various external data links.

For example, data may be formatted to use an aircraft communications addressing and reporting system (ACARS) communications protocol or an Iridium® system communications protocol when data transmission is performed over datalink radios 230 to which the communication management application 234 is operably connected. The datalink radios 230 may also be used to provide information to, and receive information from, the ground system network 206 and are preferably provided as LRU's in various embodiments.

The maintenance communication manager 208 is operably connected to a data access server 210 both directly and indirectly via an html maintenance display application 214. Both the data access server 210 and the html maintenance display application 214 may be implemented as AHMU software modules. The html maintenance display application 214 is also operable to cause the display of information relating to aircraft maintenance manuals, for example, on the external portable maintenance device 280 when it is operably connected to the Wi-Fi hub 204.

Data access server 210 is also operably coupled to a data store 212. The data store 212 may be provided using an AHMU software module, for example, using RAM, hard disk, or flash memory-based electronic data storage means. The data access server 210 is further connected to ARINC® 661 display interface standard (A661) maintenance display application 228 which is configured to provide maintenance display information, including that derived from maintenance manuals, to various aircraft displays 232.

The data access server 210 and maintenance communication manager 208 are both operably connected to aircraft condition monitoring function (ACMF) 216. The ACMF 216 can be provided using an AHMU software module, and may include a quick access recorder (QAR). Such a software module is provided to analyse parametric data to determine the health status of systems on the aircraft and is distinct from the CMS which is provided to analyse aircraft BIT data. The data access server 210 is operably coupled to aircraft health manager 222 provided by a further AHMU software module. Data access server 210 is further connected to aircraft configuration manager 218, dataload manager 220 and central maintenance system CMS 224. CMS 224 is operable to analyse the BIT (binary logic health status information) from the member systems. The aircraft configuration manager 218, dataload manager 220 and CMS 224 are provided by respective avionics ESP software modules and the CMS 224 is operably connected to the aircraft health manager 222 and further provides a member systems health manager (MSHM).

The OMS system includes a dataload distribution module 226 provided as an avionics ESP software module. The dataload distribution module 226 connects the dataload manager 220 to avionic ESP hosted applications 240 and avionic ESP connected LRU's 242. The avionic ESP hosted applications 240 and avionic ESP connected LRU's 242 are additionally connected to the aircraft configuration manager 218 through ESP configuration manager 236 which is itself provided by another avionics ESP software module.

CMS 224 and ACMF 216 are further connected to both aircraft displays 238 and an avionic ESP health monitor 244. The aircraft displays 238 may be provided as LRU's (e.g. flight deck effect/crew alerting system (FDE/CAS) for indicating when a failure is sufficiently important to the continued safety of the flight that a warning/alert is raised in the cockpit), and the avionic ESP health monitor 244 can be provided using an additional avionics ESP software module.

Figure 3:
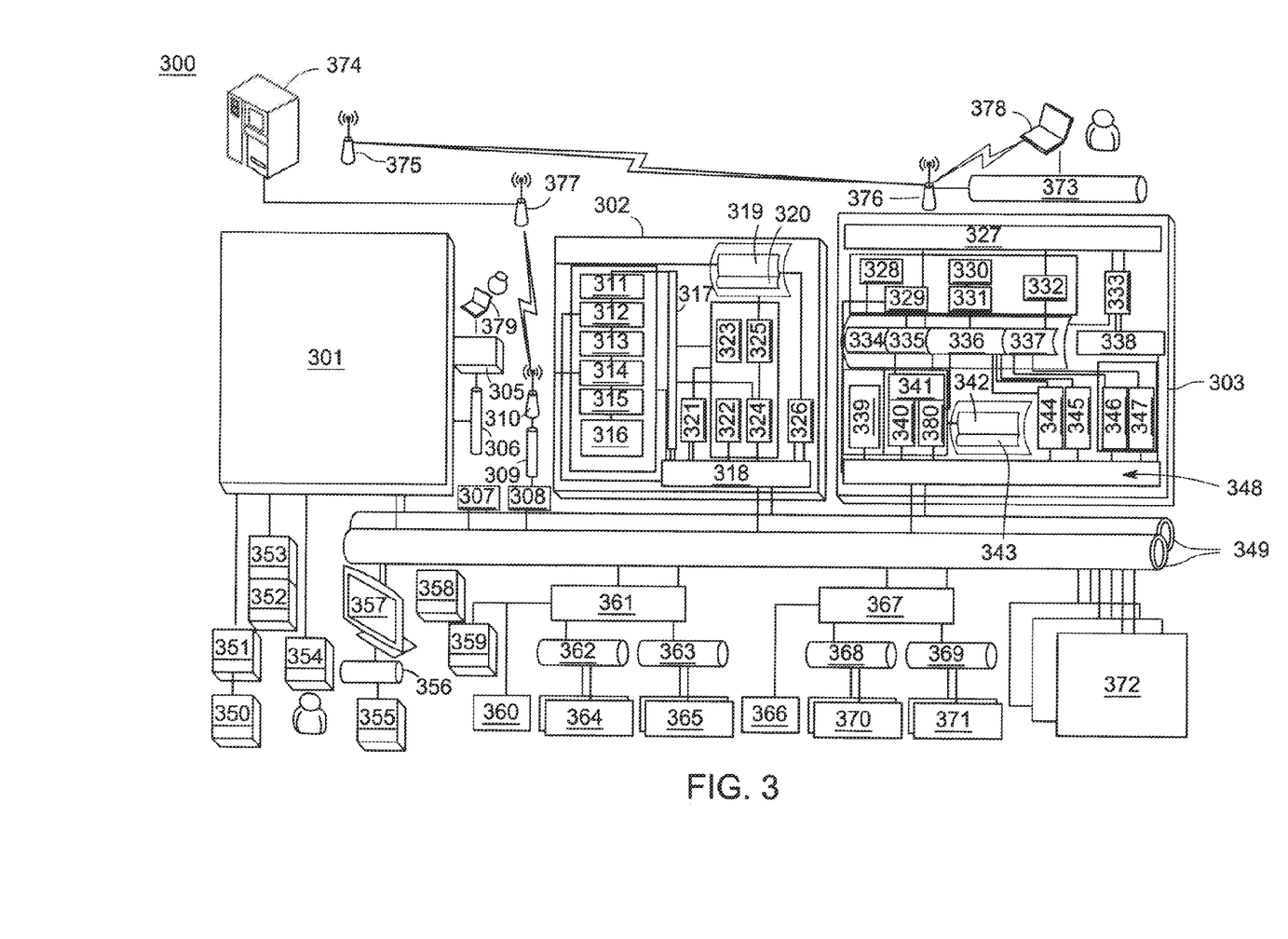
FIG. 3 shows an on-board maintenance system in accordance with another embodiment of the present invention.

FIG. 3 shows an on-board maintenance system 300 in accordance with another embodiment of the present invention. The OMS 300 may, for example, be used to implement various embodiments that use the architecture as depicted in FIG. 2.

OMS 300 includes duplicate enhanced airborne flight recorders (EAFR) 301. These may provide ARINC 767 and ED-112 standards compliance and can record flight and voice data as well as, optionally, imagery. An integrated modular avionics (IMA) cabinet 302 and AHMU 303 are also provided. The EAFRs 301, IMA cabinet 302 and AHMU 303 are connected by dual ARINC® 664P7 networks 349 [8].

The EAFR's 301 are operable to record input generated by a user in the cockpit. User input can be provided as voice input through crew microphones connected to the EAFR's 301 via audio control panels 351 or an area microphone 352 connected through a pre-amplifier 353. Further user input such as, for example, audio test switch (e.g. loop test and IBIT) and erase switch input may also be provided through a cockpit voice recorder (CVR) control panel 354 connected to the EAFR's 301.

EAFR's 301 can be connected a portable maintenance device (PMD) 379 through an Ethernet connection 306 and standard RJ45 socket 305. PMD 379 can be used in the cockpit by a maintenance engineer to analyse aircraft faults and access information relating to steps required to perform various predetermined maintenance procedures. This data may be taken from the OMS store, for example using the PMD 379 connected wirelessly to the OMS and cockpit displays.

IMA cabinet 302 provides a CMS module, a non-volatile memory (NVM) module and a dataload manager module. A display module 317, a print data module 321, a communications manager module 326 and a receive/transmit (RX/TX) data module 318 are also provided by the IMA cabinet 302. Various modules described herein may, for example, be implemented using one or more of hardware, firmware and software elements in accordance with various embodiments of the present invention.

The CMS module is operable to create and send a rigging mode request 311 whilst running a timeout check operation 312. A fault aggregation and note missing BIT results operation 316 is also performed by the CMS module. The CMS module additionally performs timeline matching 315 and CMS fault tree analysis 314 to enable initiated built in test (IBIT) requests to be created and sent 313 via the RX/TX data module 318. This enables the CMS to send a command to a member system to start a test.

The NVM module is operable to provide a set of communications rules 320 to the communications manager module 326. The NVM module also operates a CMS model 319, the results of which are provided to define a CMS fault tree used in the CMS fault tree analysis 314.

RX/TX data module 318 provides an interface between the IMA cabinet 302 and the dual ARINC® 664P7 networks 349. Timeout data may be provided over the networks 349 for setting the timeout duration of the timeout check operation 312. Bi-directional data communication is provided by the RX/TX data module 318 between the CMS module, the communications manager 326, the dataload manager module and the print data module 321. RX/TX data module 318 is additionally coupled to the CMS module and the dataload manager module through display module 317.

The dataload manager module includes a first module 322 operable to receive load and configuration status data from the RX/TX data module 318. A second module 325 is operable to request field loadable software (FLS) data from an FLS data store and to provide that data to a third module 323 operable to then present details to a maintenance engineer via the display module 317. FLS is software that can be pushed out to the aircraft and then loaded, via the dataload function, onto the member systems. A fourth module 324 connects the display module 317 and the second module 325 to the RX/TX data module 318. The fourth module 324 is operable to send FLS data to various member systems, such as various avionics systems on the aircraft like OMS, the flight controls, the Aux Power Unit, the engines, the environmental control system, the cockpit displays, etc.

AHMU 303 connects to the on-board maintenance system 300 through a RX/TX data module 348 that is operably coupled to the dual ARINC® 664P7 networks 349. AHMU 303 also comprises a dataload access module 339, an ACMF module, a NVM module, an internal data access server module, a data storage module and an external data access server module. The external data access server module is coupled to an RX/TX Ethernet data module 327 that includes communications manager functionality.

The external data access server module is operable to implement a user login process 330 and to record access attempts 331. A download data management module 332 is also provided by the external data access server module to enable data transmission from the data storage module to the RX/TX Ethernet data module 327. FLS module 328 is provided to enable FLS data received by the external data access server module to be added to an FLS storage area 334 provided in the data storage module. The data storage module also includes an SDCard QAR data storage area 335, a complete stored data area 336 and a trouble shooting (TS) manuals storage area 337. Such a data storage area may be provide so that not all the manuals need be stored on-board the aircraft, but only those required for trouble shooting.

A datastore access module 338 interfaces the data storage module with the RX/TX data module 348. The datastore access module 338, data storage module and external data access server module are all connected to a display module 333 that is further connected to the RX/TX Ethernet data module 327. The display module 333 may provide data, for example, using an html format for ease of viewing.

The dataload access module 339 is operable to pull FLS data from the FLS storage area 334 of the data storage module and to provide it to the RX/TX data module 348, when commanded to do so by the RX/TX data module 348.

The NVM module is connected to the RX/TX data module 348 and provides an ACMF analytics data capture list 342. The NMV provides a permanent storage area for the list 342. The NMV model also implements an AMH model 343. The ACMF analytics data capture list 342 is provided to the ACMF module which is operable to analyse 380 that data. The ACMF module can be commanded by the RX/TX data module 348 to determine which data to store 340, and storage module 341 activated to initiate storage of the appropriate analysed data in the SDCard QAR data storage area 335 and complete stored data area 336 of the data storage module.

A first aircraft health manager (AHM) reasoning module 344 coupled to the RX/TX data module 348 analyses the data in the complete stored data area 336 and the output of the AMH model 343 and updates the complete stored data area 336 with its findings. This may be included as part of the CMS, and is to provide additional fault isolation capabilities beyond those of the pure fault logic in the CMC. The AMH model 343 may be provided using probabilistic graphical modelling (e.g. with Bayesian reasoning).

Configuration manager 345 obtains system configuration data from the RX/TX data module 348 and provides it to the data storage module for inclusion in the complete stored data area 336. The internal data access server is connected to the data storage module and RX/TX data module 348, and includes a first module 346 for retrieving stored data from the complete stored data area 336 and a second module 347 for retrieving maintenance manuals from the TS manuals storage area 337.

OMS 300 includes a cursor control device (CCD) device 355 connected to a multi-function display (MFD) 357 via an ARINC® 825 network 356 [8]. MFD 357 is also connected to the dual ARINC® 664P7 networks 349, as are a crew alerting system (CAS) speaker 358, a printer server 307 and various ARINC® 664P7 connected LRU's 372.

A remote data interface unit (RDIU) 308 connects aircraft-based datalink radios 310 to the dual ARINC® 664P7 networks 349 via an ARINC 429 bus 309 [8]. A ground-based transmitter/receiver 377 is operable to receive signals transmitted by the datalink radios 310 and transmit them to ground support network (GSN) 374 via an Internet link. GSN 374 may provide a central repository for data where the analysis can be performed across the fleet with subsequent updating to the troubleshooting procedures then being turned into a FLS and redistributed to the aircraft. A further Internet link links the GSN 374 to transmitter/receiver 375 which is wirelessly coupled to a Wi-Fi GSM transmitter/receiver 376. The Wi-Fi GSM transmitter/receiver 376 can wirelessly connect to a PMD 378 that is accessed by a maintenance engineer on the ground. Wi-Fi GSM transmitter/receiver 376 is further operably connected to an Ethernet network 373 which is in-turn linked back to the RX/TX Ethernet data module 327 of the AHMU 303. Optionally, the PMD 378 may also be linked to the Ethernet network 373.

Various additional elements may be connected to the dual ARINC® 664P7 networks 349. By way of example, two such sub-systems are shown in FIG. 3 connected to the dual ARINC® 664P7 networks 349 respectively via RDIU 361 and RDIU 367. RDIU 361 is further connected to event button 359, various discrete and analogue sensors 360, an ARINC® 825 bus 362 and an ARINC® 429 bus 363. Various ARINC® 825 LRU's 364 are connected to the bus 362 and various ARINC® 429 LRU's 365 are connected to the bus 363. RDIU 367 is further connected to various discrete and analogue sensors 366, an ARINC® 825 bus 368 and an ARINC® 429 bus 369. Various ARINC® 825 LRU's 370 are connected to the bus 368 and various ARINC® 429 LRU's 371 are connected to the bus 369.

In various embodiments, a plurality of aircraft may connect to the ground-based transmitter/receiver 377, for example, via respective datalink radios and/or RX/TX Ethernet data modules. Data from many aircraft may thus be collected, analysed and interpreted to identify non-predetermined troubleshooting procedures for fault rectification. This may be done automatically with results optionally being disseminated to various aircraft that are connected to the OMS 300, for example, so as to permit an update of respective onboard maintenance manuals.

Figure 4:
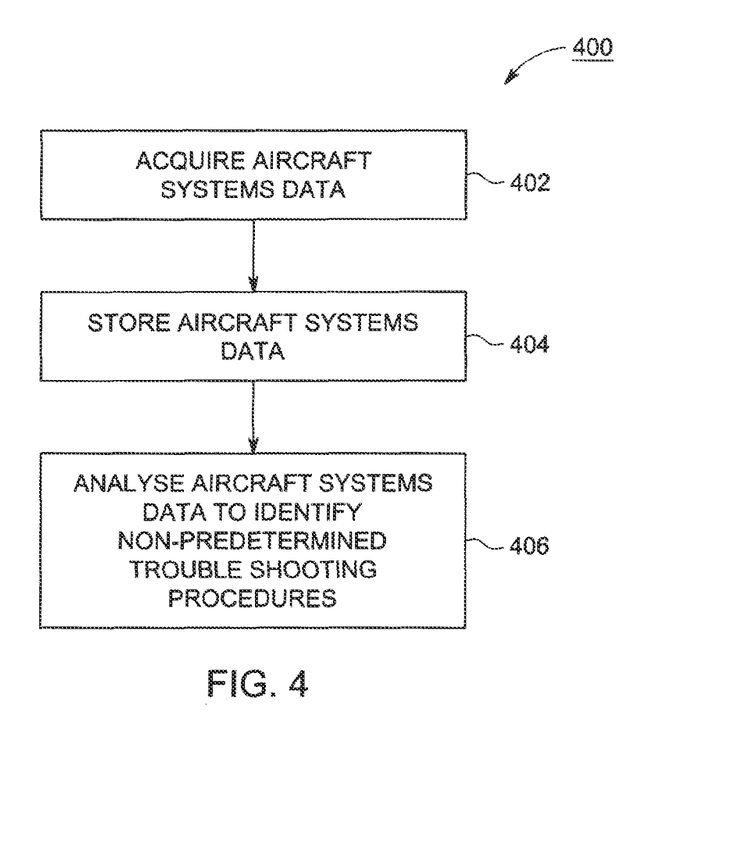
FIG. 4 shows a method for automatically analysing aircraft systems data in accordance with various embodiments of the present invention.

FIG. 4 shows a method 400 for automatically analysing aircraft systems data in accordance with various embodiments of the present invention. The method 400 includes the steps of acquiring 402 aircraft systems data, storing 404 the aircraft systems data and analysing 406 the aircraft systems data to identify non-predetermined troubleshooting procedures for fault rectification. Various of the steps 402, 404, 406 may be provided by certain of the modules referred to above.

The step of acquiring 402 aircraft systems data may include acquiring the aircraft systems data from a plurality of aircraft. The method 400 may further comprise a step of accessing a maintenance manual storage module to identify predetermined troubleshooting procedures. Optionally, automatic updating of a maintenance manual may also be included so that it includes maintenance procedures corresponding to the identified non-predetermined troubleshooting procedures. Maintenance manuals and procedures may thus be automatically adapted over time.

The method 400 may further comprise steps of capturing and/or recording and/or identifying at least one actual maintenance step undertaken during a maintenance procedure. Such step(s) may be obtained in sequence and the non-predetermined troubleshooting procedures for fault rectification identified by analysing the captured sequence of steps.

A computer program product comprising machine instructions for configuring a data processing apparatus to implement one or more steps of the method 400 may also be provided. Such a product may be operable to provide various modules in one or more data processing apparatus for implementing various of the functions needed to provide the method. Without limitation, such a computer program product may be used to upgrade existing hardware or firmware (such as an aircraft's internal health management system (IHMS), for example) so as to provide conventional aircraft with improved diagnostic tools and/or maintenance procedures.

Those skilled in the art will be aware that various techniques may be used to analyse the aircraft systems data to identify non-predetermined troubleshooting procedures for fault rectification. For example, various statistical analysis, automated heuristic, pattern matching, and/or searching techniques, etc. may be used. These may be stored temporarily or permanently, for example, in a storage module onboard one or more aircraft and/or in central database accessible by many aircraft systems. In certain embodiments, data analysis may thus be used to power diagnostics. Various closed loop systems may be provided in contrast to prior "open loop" systems in which analysis and feedback is absent.

Various embodiments may thus be used to simplify the maintenance process thus reducing maintenance time. An advantage of various embodiments is that they can also allow problems to be identified and solutions to be provided for problems that may otherwise get missed. For example, global technical experience can be analysed to identify possibly rare events that an individual engineer might not have any experience of fixing/diagnosing by himself/herself.

In various embodiments, actions could be weighted for various types of systems data analysis. For example, an action indicating that an engineer replaced an entire engine might attract a low score weighting, as it is relatively undesirable, whereas replacing a specific seal might score highly, as identifying specific components that cause a specific problem is clearly more desirable than identifying a blanket solution. Thus a component level weighting may be high; a module level/LRU weighting intermediate (or low if the specific problem is already known to be linked to this module, e.g. where arc fault detection module failure may give a relatively low weighting score for an action indicating replacement arc fault detection module compared to, say, replacing a specific current sensor in the arc fault detection module); and a system weighting level may be low.

Respective sets of steps may be provided for analysis in order, e.g. using "near" search-type analysis. System modelling, e.g. using rules-based, physics engine, neural reasoning, etc. techniques may be used to provide a feedback mechanism to provide a closed loop system such that initial predetermined procedures may be augmented by automatically determined non-predetermined maintenance procedures and/or processes. Data input may additionally be provided to various system embodiments from a pilot debrief module (PDM) that captures technical fault data logged by the pilot(s).

Various aspects and embodiments of the present invention may be provided using a software implemented tool, or tools, for providing one or more modules on various data processing apparatus. Such a tool, or tools, may be networked and may further link to an on-board maintenance system (OMS). Various embodiments may also link to one or more known flight recording systems (FRS's), for example, via one or more electronic systems platforms (ESP's).

In various embodiments, a manual is provided as a set of predetermined steps based on assumed probabilities and failure sequences when an aircraft is built. Manuals may be implemented as a model that can be updated, where the procedural steps can be reordered and/or the probabilities of given failures and the costs associated with identifying them updated based on in-service experience. Such implementation may be by way of a fault tree/table approach for binary decisions where the structure of this tree/table is updated to reflect the statistical analysis of in-service experience.

Alternatively, a probabilistic model may be built where both the structure and weightings on the model can be updated. This then allows an optimal solution to be selected based on the current experience. Such probabilities and costs may be updated from statistical analysis of the fleet data including, where appropriate, operational characteristics. For example, where a specific aircraft always does short hops, or flies in a hot dry environment.

What is claimed is:

1. A system for automatically analysing aircraft systems data, comprising:
    a data monitor operable to detect data packets transmitted over an aircraft data bus including built-in test data that identifies aircraft faults;
    a data acquisition module operable to acquire aircraft systems data including data related to predetermined troubleshooting procedures;
    an on-board maintenance system that captures aircraft configuration data including data related to changes made to the aircraft;
    a data analysis module operable to identify a performed troubleshooting procedure based on the aircraft configuration data, execute a correlation test comparing the performed troubleshooting procedure to the predetermined troubleshooting procedures, identify based on the correlation test that the performed troubleshooting procedure is a non-predetermined troubleshooting procedure for fault rectification, and update the aircraft systems data to include the non-predetermined troubleshooting procedure, wherein the non-predetermined troubleshooting procedure includes a set of performed fault rectification actions.

2. The system of claim 1, wherein the data acquisition module is further operable to acquire the aircraft systems data from a plurality of aircraft.

3. The system of claim 1, wherein the data acquisition module is further operable to access a maintenance manual storage module to identify predetermined troubleshooting procedures.

4. The system of claim 3, wherein the data analysis module is further operable to automatically update the maintenance manual to include maintenance procedures corresponding to the identified non-predetermined troubleshooting procedures.

5. The system of claim 1, further comprising a maintenance task data capture module operable to capture at least one actual maintenance step undertaken during a maintenance procedure.

6. The system of claim 5, wherein the maintenance task data capture module is further operable to capture the steps in sequence.

7. The system of claim 6, wherein the data analysis module is operable to identify the non-predetermined troubleshooting procedures for fault rectification by analysing the captured sequence of steps.

8. The system of claim 1, further comprising an input/output interface module operable to display a troubleshooting procedure via a graphical user interface.

9. A method for automatically analysing aircraft systems data, comprising the steps of:
    detecting data packets transmitted over an aircraft data bus including built-in test data that identifies aircraft faults;
    acquiring aircraft systems data including data relating to predetermined troubleshooting procedures;
    capturing aircraft configuration data including data relating to changes made to the aircraft;
    identifying a performed troubleshooting procedure based on the aircraft configuration data;
    correlating the performed troubleshooting procedure with the predetermined troubleshooting procedures, and identifying, based on the correlating, at least one non-predetermined troubleshooting procedure for fault rectification, wherein the non-predetermined troubleshooting procedure is a set of performed fault rectification actions that do not correlate to a set of predetermined troubleshooting procedures; and
    updating the aircraft systems data to include the at least one non-predetermined troubleshooting procedure.

10. The method of claim 9, wherein acquiring aircraft systems data comprises acquiring the aircraft systems data from a plurality of aircraft.

11. The method of claim 9, further comprising accessing a maintenance manual storage module to identify predetermined troubleshooting procedures.

12. The method of claim 11, further comprising automatically updating the maintenance manual to include maintenance procedures corresponding to the identified non-predetermined troubleshooting procedure.

13. The method of claim 9, further comprising recording at least one actual maintenance step undertaken during a maintenance procedure.

14. The method of claim 13, further comprising identifying a sequence comprising a plurality of steps.

15. The method of claim 14, further comprising identifying the non-predetermined troubleshooting procedures for fault rectification by analysing a captured or recorded sequence of steps.

* * * * *